(No Model.)
J. SANFORD.
CHAIR.
No. 457,567. Patented Aug. 11, 1891.
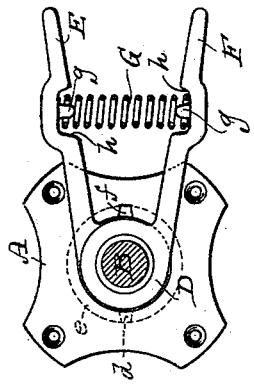
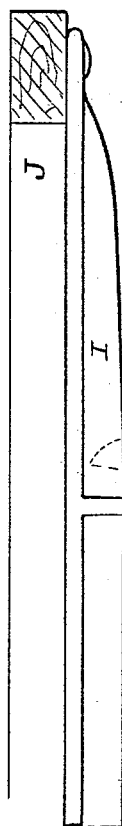
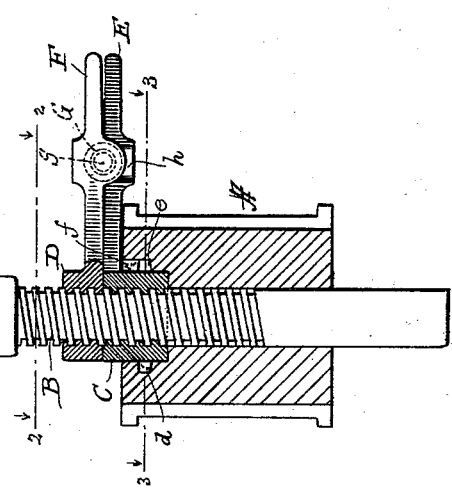
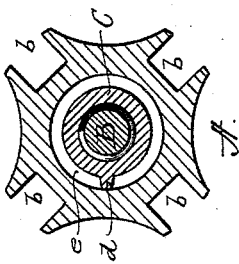
Witnesses
Geo. W. Young.
Wm Klug
Inventor
Joe Sanford
By H. G. Underwood
Attorney

UNITED STATES PATENT OFFICE.

JOE SANFORD, OF SHEBOYGAN FALLS, WISCONSIN.

CHAIR.

SPECIFICATION forming part of Letters Patent No. 457,567, dated August 11, 1891.

Application filed January 29, 1891. Serial No. 379,562. (No model.)

*To all whom it may concern:*

Be it known that I, JOE SANFORD, a citizen of the United States, and a resident of Sheboygan Falls, in the county of Sheboygan, and in the State of Wisconsin, have invented certain new and useful Improvements in Chairs; and I do hereby declare that the following is a full, clear, and exact description thereof.

My invention consists in certain peculiarities of construction and combination of parts to be hereinafter described with reference to the accompanying drawings, and subsequently claimed.

In the drawings, Figure 1 represents a vertical transverse section of a portion of a chair embodying my improvements; Fig. 2, a plan view, partly in horizontal section, on the line 2 2 of the preceding figure; Fig. 3, a horizontal section on line 3 3 of Fig. 1, and Fig. 4 a detail sectional view of a two-part bearing for the seat-supporting screw of a revolving chair.

Referring by letter to the drawings, A represents a socket-iron for the seat-supporting screw B of a revolving chair, this socket-iron being provided with the usual recesses $b$ for the reception of the upper ends of the chair-legs, (not shown,) these legs and said socket-iron forming a stand. In the present instance the bore of the socket-iron is smooth instead of being screw-threaded, as is usually the case, and the upper end of the bore is enlarged to form a seat for a two-part bearing for the screw B, above described. The lower member C of the two-part bearing is provided with a lug $d$, and this lug engages an annular groove $e$ cut in the socket-iron from the enlarged upper portion of the bore, said lug having its entrance to the groove through a recess $f$, as is best illustrated in Fig. 2. The engagement of the lug and groove just specified prevents accidental detachment of the two-part bearing and socket-iron. The lower member C and upper member D of the two-part bearing independently surround the screw B, and the thread of both members has a pitch corresponding to that of said screw.

Formed in one piece with lower member C of the two-part bearing is an arm E, and the upper member D is likewise provided with a similar arm F, these arms being opposed to each other and held apart by an interposed spring G, the latter being preferably of spiral form and having its ends engaged by lugs $g$ within recesses $h$ of said arms, as best illustrated in Fig. 2.

Fast on the upper end of the screw B is the usual head H, provided with a stop $i$, opposed to a tilting-spider I, pivotally connected to said head and having the chair-seat J secured thereto, as shown in Fig. 1.

In practice the spring G acts to spread apart the arms E F of the members C D of the two-part bearing for the screw B, and thus said members of the bearing are bound on the screw B, because of the break in the continuity of their thread, due to the movement of one in the direction opposite to that of the other. The parts being in their normal position, as just described, the screw B is locked in its adjusted position against vertical movement but not against rotation, owing to the two-part bearing for said screw being loose in the bore of the socket-iron A, as above specified. Consequently the seat of the chair is stationary as to elevation, but free to revolve. To adjust the elevation of the chair-seat, the arms E F are brought toward each other to establish a continuity of the thread in the members C D of the two-part bearing for the screw B, and by turning said chair-seat in the proper direction said screw is raised or lowered, as may be desirable, after which said arms are released to be automatically forced apart by the spring G, as above described.

By the construction and arrangement of parts set forth in the foregoing description I obtain all the advantages of a revolving tilting-chair without the disadvantage arising from the tendency of the seat-supporting screw to run down or otherwise change in the matter of adjustment with respect to elevation, as is common in such chairs as ordinarily constructed.

Having thus described my invention, what I claim as new, and desire to secure by Letters Patent, is—

1. In combination with the smooth-bore socket-iron of a revolving chair, a screw-threaded bearing comprising two members arranged one above the other loose in the bore of said socket-iron, a seat-supporting screw engaging the bearing, and suitable means for forcing the members of the bearing in opposite directions to thereby break the continuity of their thread, substantially as set forth.

2. In combination with the smooth-bore socket-iron of a revolving chair, a two-part screw-threaded bearing loose in the bore of said socket-iron, a seat-supporting screw engaging the bearing, arms extended from the members of said bearing, and a spring interposed between the arms, substantially as set forth.

3. In combination with the seat-supporting screw of a revolving chair, a socket-iron having a smooth bore enlarged at its upper end, an annular groove that communicates with the enlarged portion of said bore and has an entrance from the top of said socket-iron, a two-part screw-threaded bearing for the screw arranged in the enlarged end of the aforesaid bore, a lug on one member of the bearing engaging the adjacent annular groove, and suitable means for forcing both members of the bearing in opposite directions to break the continuity of their thread, substantially as set forth.

In testimony that I claim the foregoing I have hereunto set my hand, at Sheboygan Falls, in the county of Sheboygan and State of Wisconsin, in the presence of two witnesses.

JOE SANFORD.

Witnesses:
A. E. QUINLAN,
J. H. JAMES.